United States Patent
Chen et al.

(10) Patent No.: US 7,475,236 B2
(45) Date of Patent: Jan. 6, 2009

(54) METHOD FOR ENSURING CORRECT SUB-SYSTEM BIOS FOR SPECIFIED SYSTEM

(75) Inventors: Ata Chen, Taipei (TW); Macalas Yen, Taipei (TW); Simon Pu, Taipei (TW)

(73) Assignee: VIA Technologies, Inc., Taipei (TW)

( * ) Notice: Subject to any disclaimer, the term of this patent is extended or adjusted under 35 U.S.C. 154(b) by 519 days.

(21) Appl. No.: 11/212,281

(22) Filed: Aug. 26, 2005

(65) Prior Publication Data

US 2005/0283596 A1    Dec. 22, 2005

Related U.S. Application Data

(63) Continuation-in-part of application No. 10/217,127, filed on Aug. 12, 2002, now abandoned.

(30) Foreign Application Priority Data

May 16, 2002    (TW) ............................... 91110284 A

(51) Int. Cl.
    *G06F 9/00*    (2006.01)
(52) U.S. Cl. ............................................. 713/1; 713/2
(58) Field of Classification Search ............... 713/1, 713/2
    See application file for complete search history.

(56) References Cited

U.S. PATENT DOCUMENTS

| 5,355,489 | A |  | 10/1994 | Bealkowski et al. |
| 5,375,210 | A |  | 12/1994 | Monnes et al. |
| 5,933,652 | A | * | 8/1999 | Chen et al. ............ 710/1 |
| 6,003,130 | A | * | 12/1999 | Anderson ............... 713/2 |
| 6,081,891 | A |  | 6/2000 | Park |
| 6,161,177 | A | * | 12/2000 | Anderson ............... 713/2 |
| 6,223,283 | B1 |  | 4/2001 | Chaiken et al. |
| 6,425,079 | B1 |  | 7/2002 | Mahmoud |
| 6,438,640 | B1 | * | 8/2002 | Miyamoto et al. ..... 710/303 |
| 6,487,608 | B2 | * | 11/2002 | Gifford et al. ......... 710/8 |
| 6,647,451 | B1 |  | 11/2003 | Barmore |
| 6,880,077 | B2 |  | 4/2005 | Saw-Chu et al. |
| 6,928,541 | B2 | * | 8/2005 | Sekiguchi ............... 713/2 |

* cited by examiner

*Primary Examiner*—Chun Cao
(74) *Attorney, Agent, or Firm*—Volpe and Koenig PC

(57) ABSTRACT

A method for ensuring a correct sub-system BIOS for a specified system checks whether first identifying information associated with a system BIOS of the specified system is consistent with second identifying information associated with the sub-system BIOS upon initialization of the specified system. While a normal boot-up sequence is performed when the first identifying information is consistent with the second identifying information, a simplified boot-up sequence is performed to inform of incorrect sub-system BIOS when the first identifying information is inconsistent with the second identifying information. Following the second boot-up sequence, a warning message is given and then the specified system is halted.

18 Claims, 2 Drawing Sheets

METHOD FOR ENSURING CORRECT SUB-SYSTEM BIOS FOR SPECIFIED SYSTEM

CROSS REFERENCE TO RELATED PATENT APPLICATION

This patent application is a continuation-in-part (CIP) application of a U.S. patent application Ser. No. 10/217,127 filed Aug. 12, 2002 and now pending. The contents of the related patent application are incorporated herein for reference.

FIELD OF THE INVENTION

The present invention relates to a method for checking a BIOS of a sub-system to be cooperative with a specified system, and more particularly to a method for checking whether the sub-system BIOS is correct for the specified system.

BACKGROUND OF THE INVENTION

Various basic input/output systems (BIOSs) may be used in different applications. Even for the same application, there are various BIOS versions in response to the different requirements for different clients. Since there may be several BIOS versions available at the same time for a BIOS supplier, it is important to ensure the BIOS of a sub-system for use with a specified system to be consistent with the BIOS of the specified system. For example, when a video graphics array (VGA) chip is used with a computer system, the VGA BIOS should be consistent with the BIOS of the computer system. Sometimes, a wrong package including specified system and sub-system with inconsistent BIOS versions might be packed together and delivered to the client. Unfortunately, the client would not be conscious of the mistake until the BIOS of the sub-system is executed in the specified system and some specific functions of the sub-system cannot be executed normally. If the wrong package is sold to the end user, a lot of troubles might be rendered.

SUMMARY OF THE INVENTION

Therefore, the present invention provides a method for checking whether a sub-system BIOS is consistent with the system BIOS before the sub-system BIOS is executed in the specified system.

The present invention also provides a method for ensuring correctness of a sub-system BIOS for use in a specified system, which gives a warning message once the sub-system BIOS is detected to be inconsistent with the system BIOS.

The present invention provides a method for ensuring a correct sub-system BIOS for a specified system. The method comprises steps of: checking whether first identifying information associated with a system BIOS of the specified system is consistent with second identifying information associated with the sub-system BIOS upon initialization of the specified system; and halting the specified system if the first identifying information is inconsistent with the second identifying information.

In an embodiment, the first identifying information is read from a predetermined position of the system BIOS before the checking step.

In an embodiment, the method further comprises steps of sending out a request for the first identifying information by the sub-system; and transmitting the first identifying information from the specified system to the sub-system through an interrupt service in response to the request.

In an embodiment, the checking step is performed by a control unit disposed in the sub-system or the specified system. Alternatively, the checking step can be performed by the sub-system BIOS.

In an embodiment, a complete booting-up sequence is executed if the first identifying information is consistent with the second identifying information. On the other hand, a partial booting-up sequence is executed before halting the specified system. Preferably, the partial booting-up sequence is executed to give a warning message. The warning message, for example, can be a visible message or an audible message.

For example, the specified system can be a computer system, and the sub-system BIOS can be a video graphics array (VGA) BIOS.

For example, each of the first and second identifying information includes names of client, product and/or project. Preferably, each of the first and second identifying information further includes a section of verifying ASCII codes.

The present invention further provides a method for ensuring a correct sub-system BIOS for a specified system, which comprises steps of: checking whether first identifying information associated with a system BIOS of the specified system is consistent with second identifying information associated with the sub-system BIOS upon initialization of the specified system; performing a first boot-up sequence when the first identifying information is consistent with the second identifying information; and performing a second boot-up sequence to inform of incorrect sub-system BIOS when the first identifying information is inconsistent with the second identifying information.

In an embodiment, the specified system is halted after the second boot-up sequence.

In an embodiment, a warning message is given after the second boot-up sequence.

In a case that the specified system is a computer system, the second boot-up sequence is a standard text mode.

The present invention further provides a method for checking consistency between a VGA BIOS of a VGA chip and a system BIOS of a computer system. In the present method, a request is sent out from the VGA chip to the computer system, an interrupt service of the computer system is performed to transmit first identifying information existing in the system BIOS to the VGA chip, and the first identifying information is compared with second identifying information existing in the VGA BIOS to determine whether the VGA BIOS is consistent to the system BIOS.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

According to the present invention, a checking procedure is performed to determine whether the sub-system BIOS, e.g. a video graphics array (VGA) BIOS, to be executed in the specified system, e.g. a computer system, is consistent with the system BIOS. Preferably, the checking procedure is automatically executed upon the initialization of the specified system by a control unit disposed in the VGA chip or the computer system, or the sub-system BIOS itself.

Figure 1:
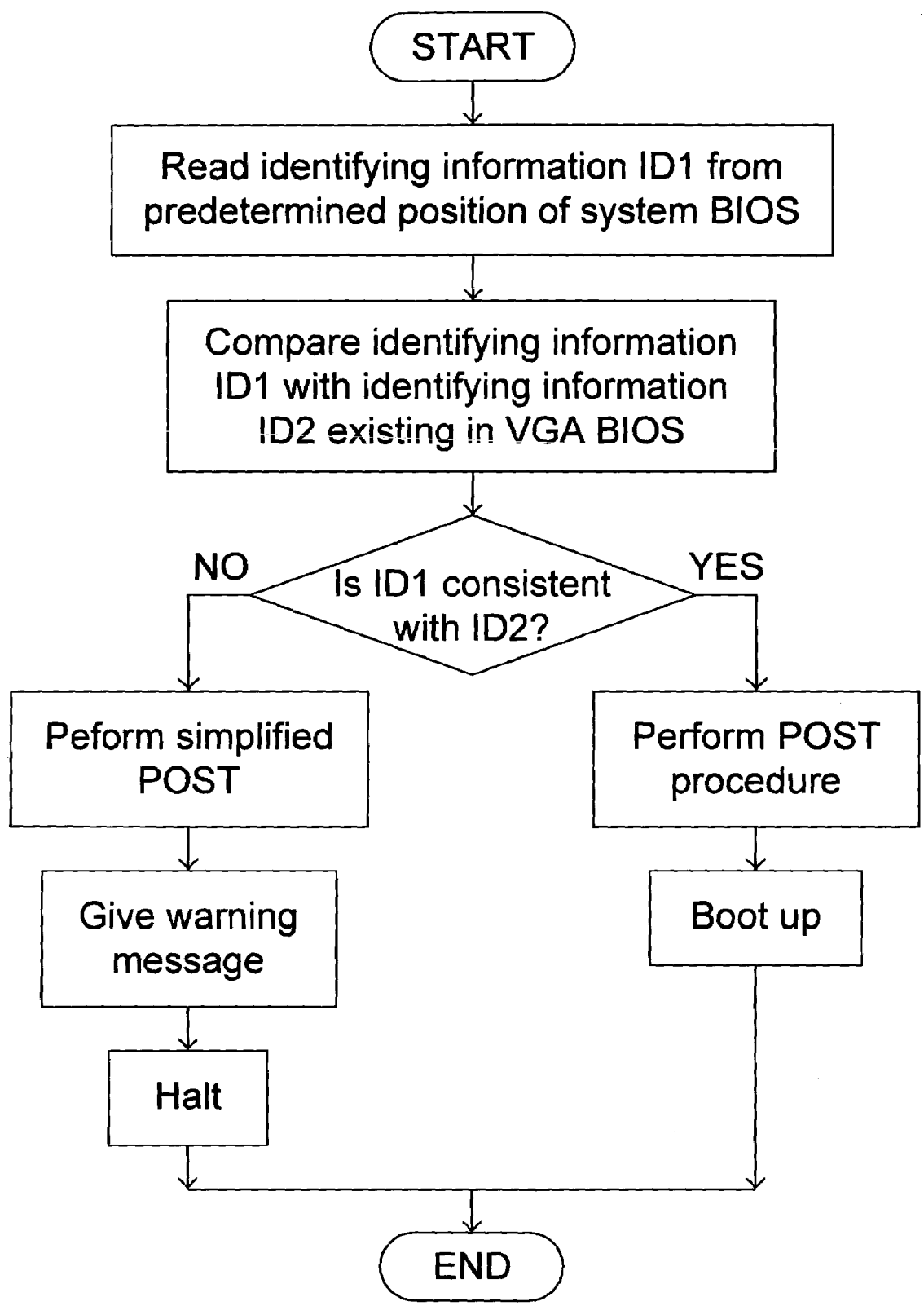
FIG. 1 is a flowchart illustrating a method for ensuring a VGA BIOS is correct for a computer system according to a first embodiment of the present invention.

In an embodiment, identifying information showing whether the VGA BIOS is consistent with the system BIOS of the computer system exists in a predetermined position of the system BIOS. Once the computer system is initialized, the control unit or the VGA BIOS reads the identifying information from the system BIOS and compares and checks if it is consistent with the present VGA chip. If positive, a normal power on self-test (POST) procedure or complete boot-up sequence is performed, and then the computer system can normally work with the VGA chip. On the other hand, if the identifying information read from the system BIOS is inconsistent, the system will be halted. Preferably, a simplified POST procedure or partial booting-up sequence, e.g. Mode 3 (standard Text Mode) is executed to inform of the abnormal situation before halting the computer system. For example, a warning message such as a visible message shown on a display of the computer system and/or an audible message sounding from a speaker of the computer system can be given. FIG. 1 illustrates a flowchart summarizing this embodiment.

Figure 2:
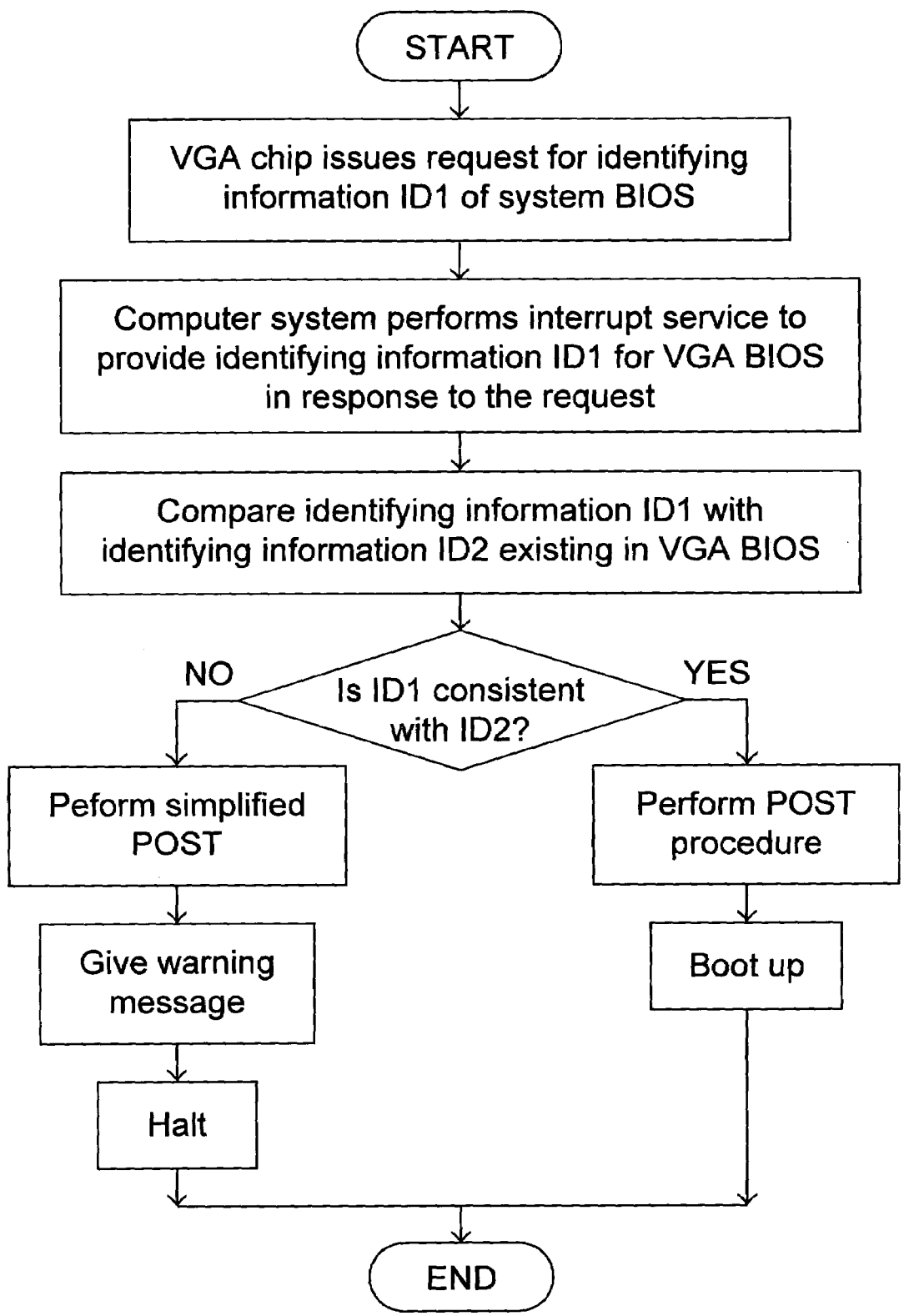
FIG. 2 is a flowchart illustrating a method for ensuring a VGA BIOS is correct for a computer system according to a second embodiment of the present invention.

In another embodiment, identifying information showing whether the VGA BIOS is consistent with the system BIOS of the computer system can be realized upon request. When the VGA BIOS issues a request to read the identifying information, the computer system does an interruption service, for example through the Int 15 interface, to provide the identifying information for the VGA BIOS. After checking the consistency of the identifying information between the VGA BIOS and system BIOS, proper measures similar to those mentioned above can be taken. That is, boot up the computer system if a consistent result is shown, and otherwise, halt the computer system. Likewise, it is preferred to give a warning message in any suitable fashion to inform the user of the abnormal situation. FIG. 2 illustrates a flowchart summarizing this embodiment.

The identifying information may vary with many factors like clients, products, projects, etc. In other words, the identifying information may include names of client, product and/or project. For purpose of double check, a section of verifying codes, e.g. ASCII codes, is preferably further checked to determine the consistency.

By checking the consistency between a sub-system BIOS with a system BIOS to be cooperative with each other in advance, the mismatching mistake, if any, can be found in an early stage so as to avoid subsequent problems.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for ensuring a correct sub-system BIOS for a specified system, comprising steps of:

said sub-system BIOS checking whether first identifying information associated with a system BIOS of the specified system is consistent with second identifying information associated with said sub-system BIOS upon initialization of the specified system; and halting the specified system if said first identifying information is inconsistent with said second identifying information.

2. The method according to claim 1 further comprising before said checking step a step of reading said first identifying information from a predetermined position of said system BIOS.

3. The method according to claim 1 further comprising steps of:

sending out a request for said first identifying information by the sub-system; and transmitting said first identifying information from the specified system to the sub-system through an interrupt service in response to said request.

4. The method according to claim 1 further comprising a step of executing a complete booting-up sequence if said first identifying information is consistent with said second identifying information.

5. The method according to claim 1 further comprising a step of executing a partial booting-up sequence before halting the specified system.

6. The method according to claim 5 wherein said partial booting-up sequence is executed to give a warning message.

7. The method according to claim 6 wherein said warning message is a visible message.

8. The method according to claim 6 wherein said warning message is an audible message.

9. The method according to claim 1 wherein the specified system is a computer system, and said sub-system BIOS is a video graphics array (VGA) BIOS.

10. The method according to claim 1 wherein each of said first and second identifying information includes names of client, product and/or project.

11. The method according to claim 1 wherein each of said first and second identifying information includes a section of verifying ASCII codes.

12. A method for ensuring a correct sub-system BIOS for a specified system, comprising steps of:

said sub-system BIOS checking whether first identifying information associated with a system BIOS of the specified system is consistent with second identifying information associated with said sub-system BIOS upon initialization of the specified system;

performing a first boot-up sequence when said first identifying information is consistent with said second identifying information; and performing a second boot-up sequence to inform of incorrect sub-system BIOS when said first identifying information is inconsistent with said second identifying information.

13. The method according to claim 12 further comprising a step of halting the specified system after said second boot-up sequence.

14. The method according to claim 12 further comprising a step of giving a warning message following said second boot-up sequence.

15. The method according to claim 12 wherein the specified system is a computer system, and said second boot-up sequence is a standard text mode.

16. The method according to claim 12 further comprising before said checking step a step of reading said first identifying information from a predetermined position of said system BIOS.

17. The method according to claim 12 further comprising steps of sending out a request for said first identifying information by the sub-system; and transmitting said first identifying information from the specified system to the sub-system through an interrupt service in response to said request.

18. A method for checking consistency between a VGA BIOS of a VGA chip and a system BIOS of a computer system, comprising steps of:

sending out a request from the VGA chip to the computer system;

performing an interrupt service of the computer system to transmit first identifying information existing in said system BIOS to the VGA chip; and comparing said first identifying information with second identifying information existing in said VGA BIOS to determine whether said VGA BIOS is consistent to said system BIOS.

* * * * *